United States Patent
Subramaniam et al.

(10) Patent No.: US 11,595,485 B2
(45) Date of Patent: Feb. 28, 2023

(54) SYSTEMS AND METHODS FOR DEMAND-BASED DYNAMIC SERVICE PROVISIONING IN AN EDGE COMPUTING SYSTEM

(71) Applicant: Verizon Patent and Licensing Inc., Basking Ridge, NJ (US)

(72) Inventors: Ramanathan Subramaniam, Old Bridge, NJ (US); Sandarsh Aramballi Devappa, Cupertino, CA (US); Sandipkumar V. Shah, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/321,183

(22) Filed: May 14, 2021

(65) Prior Publication Data

US 2022/0368767 A1 Nov. 17, 2022

(51) Int. Cl.
*H04L 67/51* (2022.01)
*G06V 10/40* (2022.01)
*G06V 20/00* (2022.01)
*H04L 67/52* (2022.01)

(52) U.S. Cl.
CPC ............. *H04L 67/51* (2022.05); *G06V 10/40* (2022.01); *G06V 20/00* (2022.01); *H04L 67/52* (2022.05); *G06V 2201/03* (2022.01)

(58) Field of Classification Search
CPC ......... H04L 67/16; H04L 67/18; H04L 67/51; H04L 67/52; G06K 9/00624; G06K 9/46; G06K 2209/00; G06V 10/40; G06V 20/00; G06V 2201/03
See application file for complete search history.

(56) References Cited

U.S. PATENT DOCUMENTS

| 10,771,569 B1* | 9/2020 | Wang .................... H04W 24/02 |
| 2009/0154367 A1* | 6/2009 | Aaron ................. H04W 64/006 370/252 |
| 2012/0131129 A1* | 5/2012 | Agarwal ............. H04L 43/0852 709/216 |
| 2016/0248650 A1* | 8/2016 | Galime ................. H04L 43/087 |

(Continued)

OTHER PUBLICATIONS

Sun et al, Edge_Cloud_Computing_and_Artificial_Intelligence_in_Internet_of_Medical_Things_Architecture_Technology_and_Application (Year: 2020).*

*Primary Examiner* — Kevin T Bates
*Assistant Examiner* — Ranjan Pant

(57) ABSTRACT

A system described herein may provide a technique for the dynamic selection of edge computing devices, such as Multi-Access/Mobile Edge Computing devices ("MECs"), to provide services to User Equipment ("UEs") based on factors such as MEC load, services and/or applications available or supported by particular MECs, UE location, service requirements, and/or other factors. One or more devices that are external to a network with which MECs are provided may be able to request services from a suitable MEC and/or identify a suitable MEC to provide such services. In this manner, control over the selection of particular MECs may be provided to devices or systems that are external to the network, thus providing an enhanced level of granular control and dynamism to such external devices or systems with respect to MEC selection.

20 Claims, 8 Drawing Sheets

(56) References Cited

U.S. PATENT DOCUMENTS

| | | | |
|---|---|---|---|
| 2019/0042867 A1* | 2/2019 | Chen | G06N 3/063 |
| 2019/0236371 A1* | 8/2019 | Boonmee | G06K 9/6269 |
| 2019/0364492 A1* | 11/2019 | Azizi | H04W 48/16 |
| 2020/0008044 A1* | 1/2020 | Poornachandran | G01C 21/3461 |
| 2020/0034455 A1* | 1/2020 | Chandra Sekar Rao | G06N 3/08 |
| 2020/0059825 A1* | 2/2020 | Xu | H04W 48/06 |
| 2020/0322836 A1* | 10/2020 | Lekutai | H04W 24/10 |
| 2020/0372069 A1* | 11/2020 | Pearlman | G06F 16/9566 |
| 2021/0044509 A1* | 2/2021 | Brown | H04L 43/08 |
| 2021/0144202 A1* | 5/2021 | Maciocco | H04L 67/16 |
| 2021/0216822 A1* | 7/2021 | Paik | G16H 15/00 |
| 2021/0398650 A1* | 12/2021 | Baker | G16H 30/20 |

\* cited by examiner

SYSTEMS AND METHODS FOR DEMAND-BASED DYNAMIC SERVICE PROVISIONING IN AN EDGE COMPUTING SYSTEM

BACKGROUND

Service providers may provide network-based services to User Equipment ("UEs"), such as mobile telephones, Internet of Things ("IoT") devices, Machine-to-Machine ("M2M") devices, tablet computers, workstations, and/or other types of devices. Some services may be associated with service requirements, such as Quality of Service ("QoS") requirements including latency requirements, and/or processing requirements such as processor-related requirements, memory-related requirements, storage-related requirements, or the like. Some networks may include edge-based computing devices, such as Multi-Access/Mobile Edge Computing ("MEC") devices, referred to herein simply as "MECs," to provide services according to such requirements.

DETAILED DESCRIPTION OF EXAMPLE EMBODIMENTS

The following detailed description refers to the accompanying drawings. The same reference numbers in different drawings may identify the same or similar elements.

Embodiments described herein provide for the dynamic selection of edge computing devices, such as MECs, to provide services to UEs based on factors such as MEC load, services and/or applications available or supported by particular MECs, UE location, service requirements (e.g., QoS requirements such as latency, and/or resource requirements such as amount and/or availability of processing resources, memory resources, storage resources, and/or other resources), and/or other factors. Further, as described herein, one or more devices that are "external" to a network with which MECs are provided may be able to request services from a suitable MEC and/or identify a suitable MEC to provide such services. In this manner, control over the selection of particular MECs may be provided to devices or systems that are external to the network, thus providing an enhanced level of granular control and dynamism to such external devices or systems with respect to MEC selection. For example, such external devices or systems may be able to make MEC selections based on factors that are not necessarily used by, and/or available to, the network (e.g., service requirements, processing requirements, etc.). Further, the process of MEC selection may be offloaded from the network, thereby consuming processing resources of the network itself. The description herein refers to examples in the context of MECs. In practice, similar concepts may apply to other types of edge computing devices, which may be devices or systems that are deployed in geographically diverse regions and which each serve a respective region or set of regions.

Figure 1:
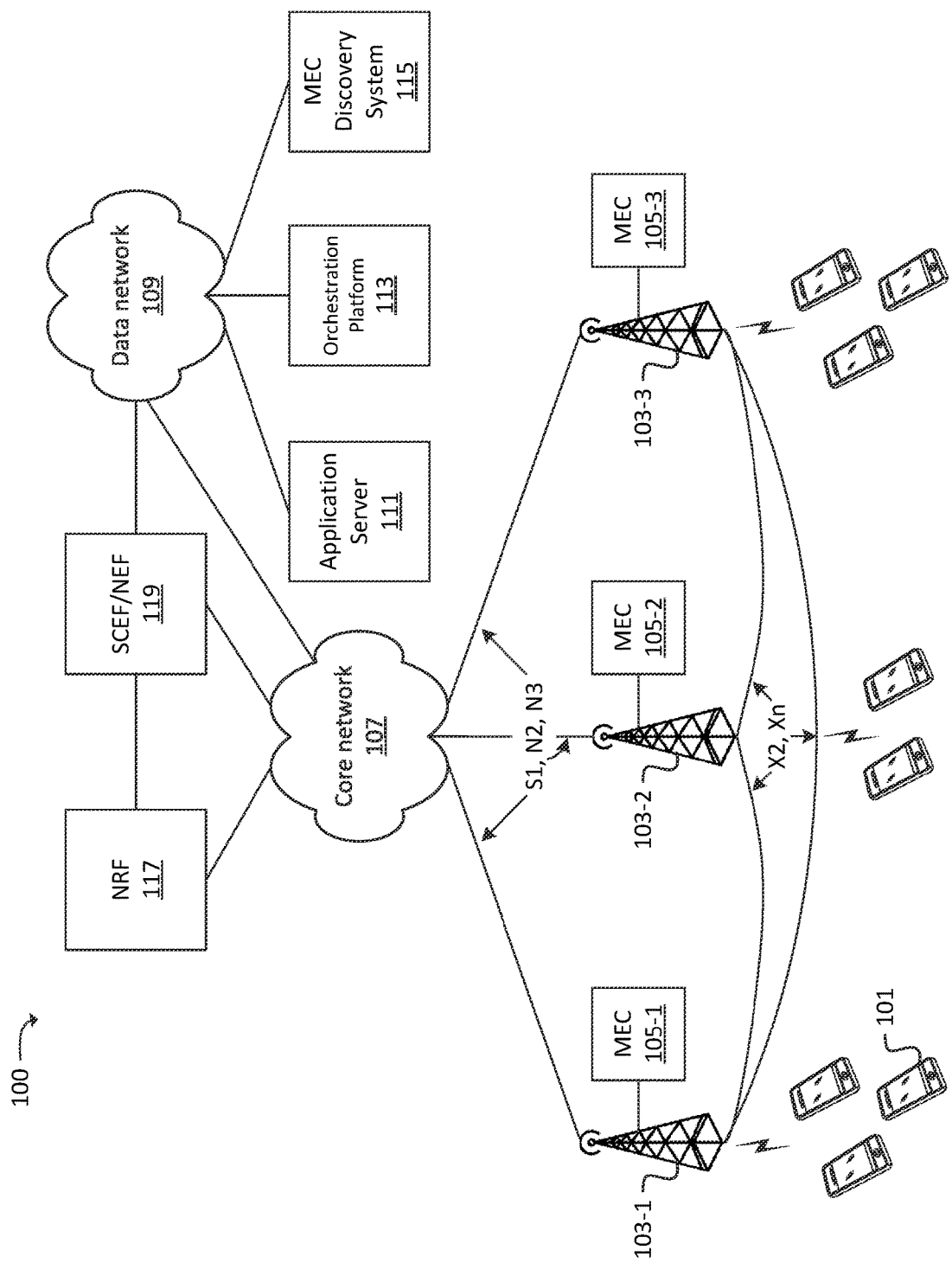
FIG. 1 illustrates an example environment in which one or more embodiments, described herein, may be implemented.

FIG. 1 illustrates an example environment 100, in which some embodiments may be implemented. As shown, for example, UEs 101 may wirelessly connect to one or more base stations 103. Base stations 103 may be deployed in diverse geographical regions, such as multiple locations within a city, different cities, different states, different provinces, and/or other different geographical regions. Base stations 103 may be components of one or more RANs, such as a Long-Term Evolution ("LTE") RAN, a Fifth Generation ("5G") RAN, and/or some other type of RAN. As discussed below, in some embodiments, base stations 103 may include separate control components and/or radio frequency ("RF") components, such as one or more Central Units ("CUs"), Distributed Units ("DUs"), or other suitable types of components. In some embodiments, base stations 103 may be implemented in an Open RAN ("O-RAN") architecture, as described below.

As further shown, each base station 103 may be associated with one or more respective MECs 105, in some embodiments. For example, base station 103-1 may be associated with MEC 105-1, base station 103-2 may be associated with MEC 105-2, and base station 103-3 may be associated with MEC 105-3. In some embodiments, a particular base station 103 may be associated with multiple MECs 105, and/or may not be associated with any MECs 105. In some embodiments, MECs 105 may be co-located with respective base stations 103 (e.g., implemented by the same hardware, data center, etc. that implements some or all of a given base station 103), and/or may be located remote with respect to a given base station 103. For example, a particular MEC 105 may be implemented by a different set of hardware than is used to implement an associated base station 103, and such MEC 105 and base station 103 may communicate via a suitable interface (e.g., a fiber interface, a low-latency wireless interface, and/or other suitable type of communication pathway).

In some embodiments, base stations 103 may receive traffic for UEs 101 from core network 107, which may be or may include an Evolved Packet Core ("EPC"), a Fifth Generation Core ("5GC"), and/or some other type of core network. Core network 107 may receive traffic from UEs 101 (e.g., via respective base stations 103) and route the traffic to one or more external networks or devices, such as Application Server 111 (e.g., via data network 109). In some embodiments, data network 109 may be, may include, and/or may be communicatively coupled to the Internet and/or one or more other types of networks. Thus, Application Server 111, Orchestration Platform 113, and/or MEC Discovery System 115 may communicate with UEs 101 and/or one or more other elements of core network 107 via data network 109. For example, core network 107 may provide traffic to UEs 101 (e.g., via base station 103) received from Application Server 111 via data network 109.

As described herein, Application Server 111, Orchestration Platform 113, and/or MEC Discovery System 115 may communicate with one or more elements of core network 107 via Service Capability Exposure Function ("SCEF")/ Network Exposure Function ("NEF") 119. SCEF/NEF 119 may be or may include a SCEF in some embodiments, and/or may be or may include a NEF in some embodiments. SCEF/NEF 119 may allow for external devices or systems, such as Application Server 111, Orchestration Platform 113, and/or MEC Discovery System 115, to receive network information (e.g., as provided by NRF 117) and/or to issue commands or instructions, such as network configuration modifications. For example, as described herein, such network information may include information such as load, performance, and/or configuration information associated with one or more MECs 105, and network configuration modifications may include information such as services to install at particular MECs 105 and/or the assignment of particular MECs 105 to provide services to one or more UEs 101 (e.g., in order to meet service requirements associated with services scheduled to be, and/or otherwise determined to be, in demand for such UEs 101).

In some embodiments, base stations 103 may communicate with each other via an X2 interface, an Xn interface, and/or some other suitable interface. For example, as described herein, a MEC 105 associated with one base station 103 (e.g., MEC 105-2 associated with base station 103-2) may be selected to provide services to a UE 101 that is connected to a different base station 103 (e.g., base station 103-1). In such embodiments, base station 103-1 may provide some or all uplink traffic, received UE 101 (e.g., traffic associated with a particular service associated with MEC 105-2) to base station 103-2, and base station 103-2 may provide downlink traffic associated with UE 101 (e.g., traffic received from MEC 105-2) to base station 103-1.

Further, base stations 103 may provide (e.g., via an S1 interface, an N2 interface, an N3 interface, and/or one or more other suitable interfaces) information regarding respective MECs 105 to one or more elements of core network 107 (e.g., NRF 117 and/or one or more other elements of core network 107). For example, base stations 103 may provide configuration information, such as particular services installed on MECs 105, to one or more elements of core network 107. In some embodiments, base stations 103 may provide hardware information, such as a type or quantity of processors associated with a given MEC 105, a type or amount of memory associated with a given MEC 105, a type or amount of storage resources (e.g., hard disks, solid state drives, flash memory, etc.) associated with a given MEC 105, and/or other hardware information. In some embodiments, base station 103 may provide performance information associated with a given MEC 105, such as latency of communications between MEC 105 and one or more UEs 101 connected to base station 103 (and/or another base station 103). In some embodiments, such performance information may be further based on location information associated with UEs 101, where UEs 101 located at different locations (e.g., within a coverage area of one or more base stations 103) may receive service with differing amounts of latency. In some embodiments, base station 103 may provide (e.g., to core network 107) load information associated with a respective MEC 105, such as a proportion or amount of resources that are available and/or are used with respect to a given MEC 105 (e.g., 60% of processor resources utilized or available, 80% of memory resources utilized or available, 50% of storage resources utilized or available, etc.). In some embodiments, base station 103 may provide (e.g., to core network 107) service information associated with a respective MEC 105, such as services installed at MEC 105, services available for installation at MEC 105, services restricted from being installed at MEC 105 (e.g., based on one or more constraints, such as anti-affinity constraints restricting particular combinations of services being installed at the same MEC and/or other constraints), or the like.

Application server 111, Orchestration Platform 113, and MEC Discovery System 115 may perform one or more operations described herein. For example, Application Server 111, Orchestration Platform 113, and/or MEC Discovery System 115 may determine (e.g., from NRF 117, via SCEF/NEF 119) the demand for a given service at a given geographical location, receive performance and/or load information associated with one or more MECs 105, select a particular MEC 105 to provide the service, and output a command, instruction, etc. to configure the particular MEC 105 to provide the service (e.g., to one or more UEs 101 associated with the demand at the given geographical location).

Figure 2:
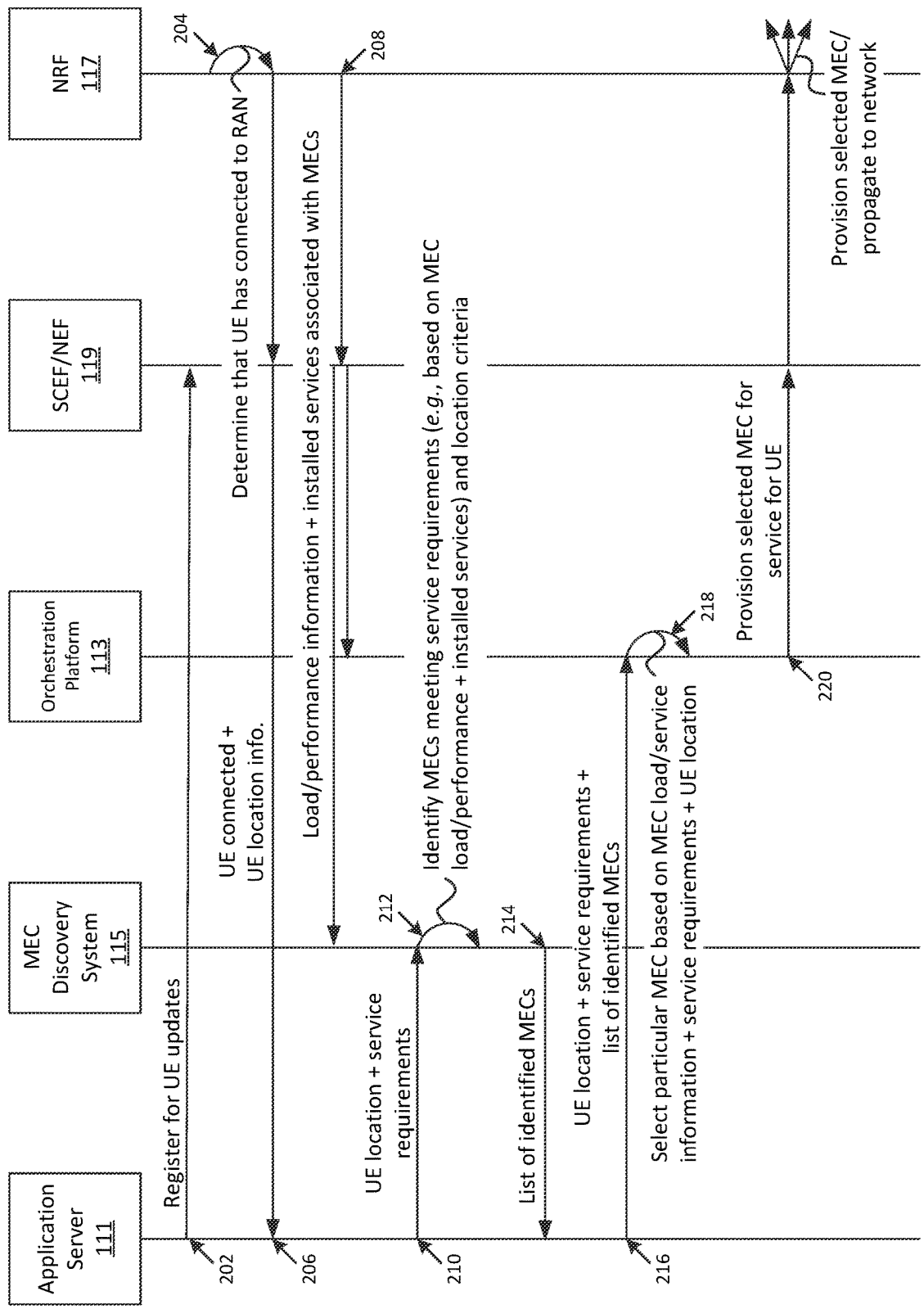
FIGS. 2 and 3 illustrate example signal flows for demand-based provisioning of services at edge computing devices, in accordance with one or more embodiments described herein.

FIG. 2 illustrates an example signal flow in accordance with one or more embodiments, in which an optimal MEC 105 may be selected to provide a given service to one or more UEs 101. As shown, for example, Application Server 111 may register (at 202) with SCEF/NEF 119 for updates regarding one or more UEs 101. For example, UE 101 may be a device or system that has registered with Application Server 111 as requiring one or more particular services, such as services related to performing processing on traffic to or from UE 101. Such services and/or processing may include augmented reality ("AR") services, artificial intelligence/ machine learning ("AI/ML") processing on input received from UE 101 and/or multiple UEs 101, biomedical services (e.g., services related to assisting with medical procedures, such as performing processing, feature identification, etc. on video and/or image data received from one or more medical instruments), content delivery services, gaming services, and/or other services. Application server 111 may be or may include, for example, a web portal, an onboarding system, or the like via which one or more UEs 101 may be registered for such services.

When registering (at 202) UE 101 with SCEF/NEF 119, Application Server 111 may provide one or more identifiers of UE 101, such as a Mobile Directory Number ("MDN"), an Internet Protocol ("IP") address, a Media Access Control ("MAC") address, a Subscription Permanent Identifier ("SUPI"), a Globally Unique Temporary Identifier ("GUTI"), and/or one or more other suitable identifiers of UE 101. For example, Application Server 111 may receive such information via a text entry from a user of UE 101, via an application executing at UE 101 that obtains such information and provides the information to Application Server 111 (e.g., via an application programming interface ("API") or other suitable communication pathway), and/or from some other source. UE 101 may be, may include, and/or may be communicatively coupled to a mobile telephone, an IoT device, an M2M device, a tablet computer, a workstation, a medical device, and/or some other type of device with network communication capabilities. The updates for which Application Server 111 may register with SCEF/NEF 119 may include the connection of UE 101 to a network (e.g., to a particular base station 103), a handover of UE 101 from one base station 103 to another base station 103, the establishment of a communication session (e.g., an Internet Protocol ("IP") session, a protocol data unit ("PDU") session, etc.), and/or some other type of connection-related event involving UE 101.

As further shown, NRF 117 may, at some point, determine (at 204) that UE 101 has connected to a particular RAN (e.g., a particular base station 103). In some embodiments, NRF 117 may determine some other type of connection-related event involving UE 101. For example, NRF 117 may receive, from base station 103 and/or some other device or system, an indication regarding the connection-related event. In some embodiments, NRF 117 may receive information regarding a geographical location associated with UE 101, such as latitude and longitude coordinates, Global Positioning System ("GPS") coordinates, a tracking area, a cell associated with a given base station 103, etc.

NRF 117 may output (at 206) an indication to SCEF/NEF 119 that UE 101 has connected to the RAN, and SCEF/NEF 119 may forward the indication (and/or a notification that is based on the received indication) to Application Server 111. SCEF/NEF 119 may further provide location information associated with UE 101 (e.g., some or all of the location information received from NRF 117). In some embodiments, NRF 117 may provide the indication to SCEF/NEF 119 without an explicit request or registration of UE 101 with NRF 117. In some embodiments, NRF 117 may provide the indication to SCEF/NEF 119 based on a request or registration of UE with NRF 117 (e.g., SCEF/NEF 119 may register UE 101 with NRF 117 based on the registration received (at 202) from Application Server 111).

NRF 117 may further output (at 208) load and/or performance information, and/or installed service information associated with one or more MECs 105. As noted above, the load and/or performance information for a given MEC 105 may indicate an amount of processor load and/or capacity associated with MEC 105, memory load and/or capacity associated with MEC 105, latency metrics associated with MEC 105 and various UEs 101 and/or geographical locations, and/or other suitable information. Further, the installed service information may indicate a set of services installed, provisioned, etc. at MEC 105, and may include information regarding installed applications, virtual machines, containers, or the like installed or provisioned at MEC 105. SCEF/NEF 119 may further output the load/performance information and/or the installed service information to Orchestration Platform 113 and MEC Discovery System 115. For example, Orchestration Platform 113 and MEC Discovery System 115 may have previously been authenticated and/or authorized to receive such information via a registration process with SCEF/NEF 119 and/or one or more other suitable devices or systems. In this manner, Orchestration Platform 113 and/or MEC Discovery System 115 may "monitor" the load/performance information and/or installed service information associated with one or more MECs 105. In some embodiments, the monitoring (at 208) may be on a periodic basis, an intermittent basis, and/or some other ongoing basis. In this manner, Orchestration Platform 113 and/or MEC Discovery System 115 may maintain up-to-date information regarding MECs 105 in real time or near-real time. In some embodiments, the monitoring (at 208) may be performed concurrently with, before, or after one or more of the other operations depicted in FIG. 2. That is, the monitoring (at 208) may be performed on a basis that is independent of the other operations depicted in FIG. 2.

In some embodiments, MEC Discovery System 115 may generate one or more scores, rankings, or the like based on the received (at 208) load/performance information. For example, a MEC 105 that is relatively less loaded (e.g., has more resources available, and/or fewer resources consumed) may be associated with a higher score than a MEC 105 that is relatively more loaded (e.g., has fewer resources available, and/or more resources consumed). In some embodiments, different scores may be generated for different locations. For example, a particular MEC 105 may provide services with lower latency to a first geographical location or region, and may thus be associated with a relatively higher score for the first geographical location or region, while the same MEC 105 may provide services with higher latency to a second geographical location or region and may thus be associated with a relatively lower score for the second geographical location or region. In some embodiments, MEC Discovery System 115 may generate or maintain other measures of MEC performance, load, etc.

Figure 4:
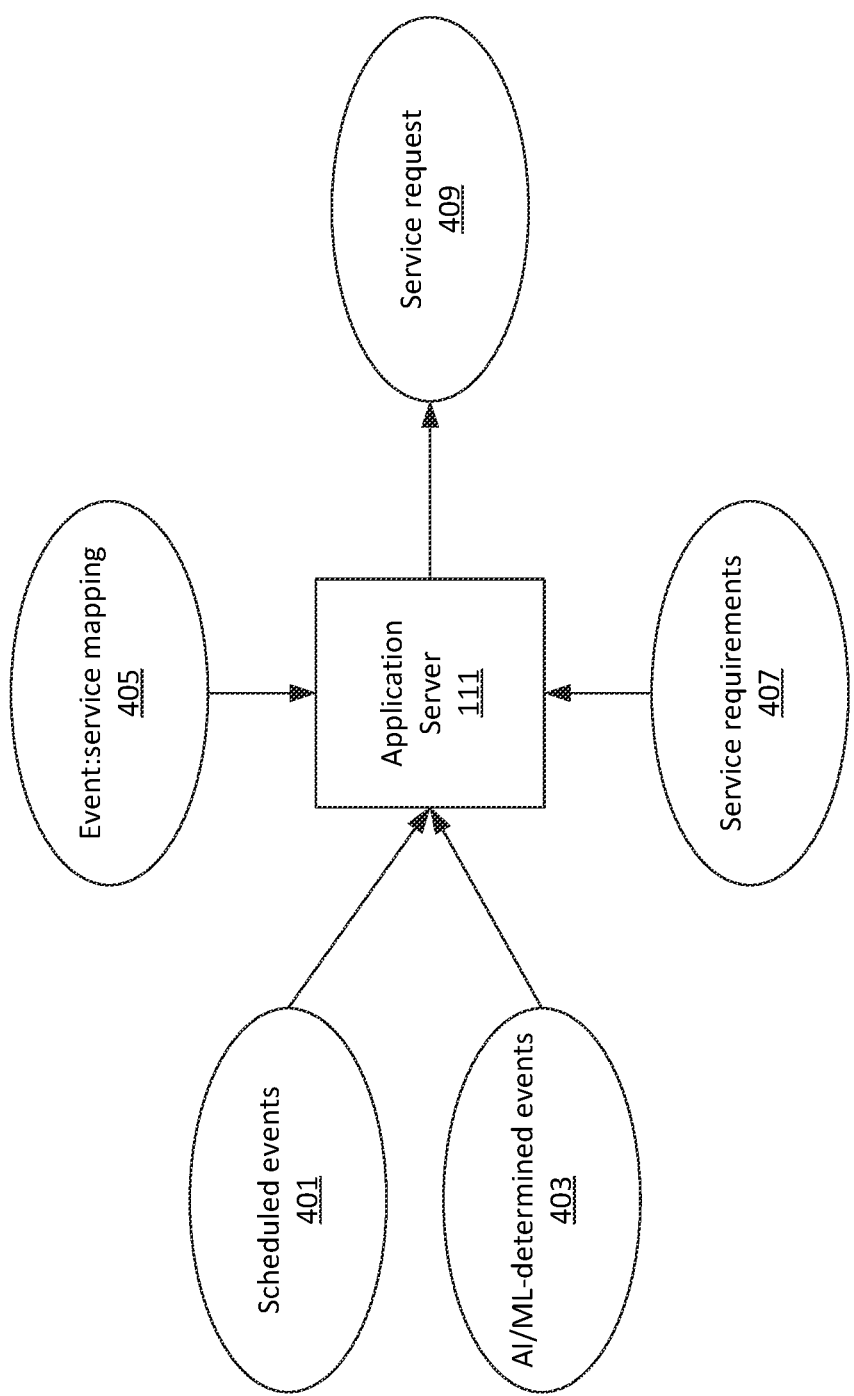
FIG. 4 illustrates an example determination of demand for one or more services to be provided by an edge computing device, in accordance with one or more embodiments described herein.

Application server 111 may output (at 210) the geographical location of UE 101 (e.g., as indicated at 206) to MEC Discovery System 115, as well as service requirements for one or more services that should be provided to UE 101. For example, Application Server 111 may have received a request (e.g., from UE 101 or some other device or system) or other indication that a particular service (e.g., a MEC-implemented service) should be provided to UE 101. As another example, Application Server 111 may determine a demand for a particular service within a particular geographical area based on scheduled events, AI/ML analysis, sensor readings, and/or other suitable techniques. FIG. 4, described below, provides further examples of how Application Server 111 may determine that a particular service should be provided to UE 101 and/or to a particular geographical region.

MEC Discovery System 115 may identify (at 212) one or more MECs 105 meeting the service requirements and/or meeting location criteria associated with UE 101. For example, MEC Discovery System 115 may compare the service requirements (received at 210) to the load/performance information and/or installed service information associated with one or more MECs 105 for which such information was received (at 208) from SCEF/NEF 119 and/or some other source. As discussed above, for instance, MEC Discovery System 115 may determine one or more scores or other measures of performance for each MEC 105 of a set of MECs 105. In some embodiments, MEC Discovery System 115 may generate a score of zero (or some other suitable score) for MECs 105 that do not meet the service requirements, such as MECs 105 that have lower than the threshold amount of resources available for the requested service, MECs 105 that have some constraint that would prevent the installation or usage of the requested service, etc.

In some embodiments, MEC Discovery System 115 may filter MECs 105 that are within a threshold proximity of UE 101 and/or are otherwise filtered based on their locations and the location of UE 101, such that MECs 105 not meeting such criteria may not be considered to provide services to UE 101. As also noted above, the scores may further be identified with respect to a location of UE 101, such that the MEC 105 with the highest measure of performance with respect to the location of UE 101 may be identified. MEC Discovery System 115 may further identify MECs 105 that have the requested services installed, and/or which are capable of having such services installed. In some embodiments, a first MEC 105 which already has a requested service installed may be associated with a higher score than a second MEC 105 which does not already have the requested service installed.

MEC Discovery System 115 may further provide (at 214) a list of identified MECs 105 (e.g., MECs meeting the service requirements and location criteria) to Application Server 111. In some embodiments, MEC Discovery System 115 may identify a predetermined quantity of MECs 105 that meet the service requirements and the location criteria, and the list may include only (or up to) the predetermined quantity of MECs 105. In some embodiments, the list may include all MECs 105 identified by MEC Discovery System 115 as meeting the service requirements. In some embodiments, the list may include one or more randomly selected MECs 105 that meet the service requirements. In some embodiments, in lieu of a list of multiple MECs 105, MEC Discovery System 115 may indicate a single MEC 105 (e.g., a MEC 105 with a highest score, a randomly selected MEC 105, and/or some other single MEC 105) to Application Server 111.

When providing (at 214) the list of MECs 105, MEC Discovery System 115 may provide may include one or more identifiers of such MECs 105, such as IP addresses, hostnames, base stations 103 with which such MECs 105 are associated, and/or other suitable identifiers. MEC Discovery System 115 may further include scores and/or other measures of MEC performance and/or load, which may include raw or derived values reflecting performance and/or load of MECs 105 included in the list.

Application server 111 may output (at 216) the UE location information, service requirements associated with the requested service, and the list of identified MECs 105 (e.g., including the scores and/or other measures of MEC performance and/or load) to Orchestration Platform 113. Application server 111 may communicate via an API or other suitable communication interface. In some embodiments, Application Server 111 may have previously registered with Orchestration Platform 113 (and/or vice versa), such that Application Server 111 is able to request MEC-based services to be provided to UEs 101 that have been identified by Application Server 111 as requiring or requesting such services.

Orchestration Platform 113 may select a particular MEC 105 (e.g., from the list) based on the MEC performance/load information, installed service information, the service requirements associated with the requested service, the location of UE 101, and/or one or more other suitable criteria. For example, Orchestration Platform 113 may perform load balancing analysis techniques, scheduling analysis techniques, energy usage and/or conservation analysis techniques, and/or other suitable techniques in order to select a particular MEC 105 based on the provided (at 216) information regarding MECs 105 and/or UE 101.

Orchestration Platform 113 may further provision (at 220) the selected MEC 105 for the requested service to be provided to UE 101. For example, Orchestration Platform 113 may output an instruction, command, etc. to SCEF/NEF 119, NRF 117, and/or some other device or system that is able to cause the selected service to be provided by MEC 105 to UE 101. For instance, Orchestration Platform 113 may output information that may be used by MEC 105 to identify that UE 101 is authorized to access the particular service from MEC 105, and/or may cause the particular service to be installed, activated, instantiated, etc. at MEC 105. In some embodiments, when MEC 105 has no available resources and/or not enough resources to install, activate, etc. the particular service, Orchestration Platform 113 may identify services to uninstantiate, uninstall, deactivate, etc. in order to free up resources for the particular service. For example, Orchestration Platform 113 may identify services that have not been used in a predetermined amount of time, services with an amount of utilization that is below a threshold utilization and/or is utilized less heavily than other services, services for which no or low demand is predicted, etc.

In some embodiments, NRF 117 may propagate information to MEC 105, a base station 103 with which MEC 105 is associated, a base station 103 to which UE 101 is connected, or other network functions regarding the selection of MEC 105 to provide the particular service to UE 101. In some embodiments, NRF 117 may propagate such information to one or more routers, hubs, Domain Name System ("DNS") components, or the like regarding the selection of MEC 105 to provide the particular service to UE 101.

In some embodiments, the information regarding the selection of MEC 105 to provide the particular service to UE 101 may include identifying information for the service, such as one or more Uniform Resource Locators ("URLs"), IP addresses, application identifiers, or the like, associated with the service. In some embodiments, the information regarding the selection of MEC 105 to provide the particular service to UE 101 may include one or more identifiers of UE 101, such as an IP address, an MDN, a SUPI, a GUTI, and/or some other suitable identifier of UE 101. Based on identifying traffic with the identifying information for UE 101 and/or the service, one or more network devices such as base station 103, routers, hubs, etc. may route such traffic to the selected MEC 105 rather than to core network 107. In this manner, the selected MEC 105 may provide the service to UE 101.

Figure 3:
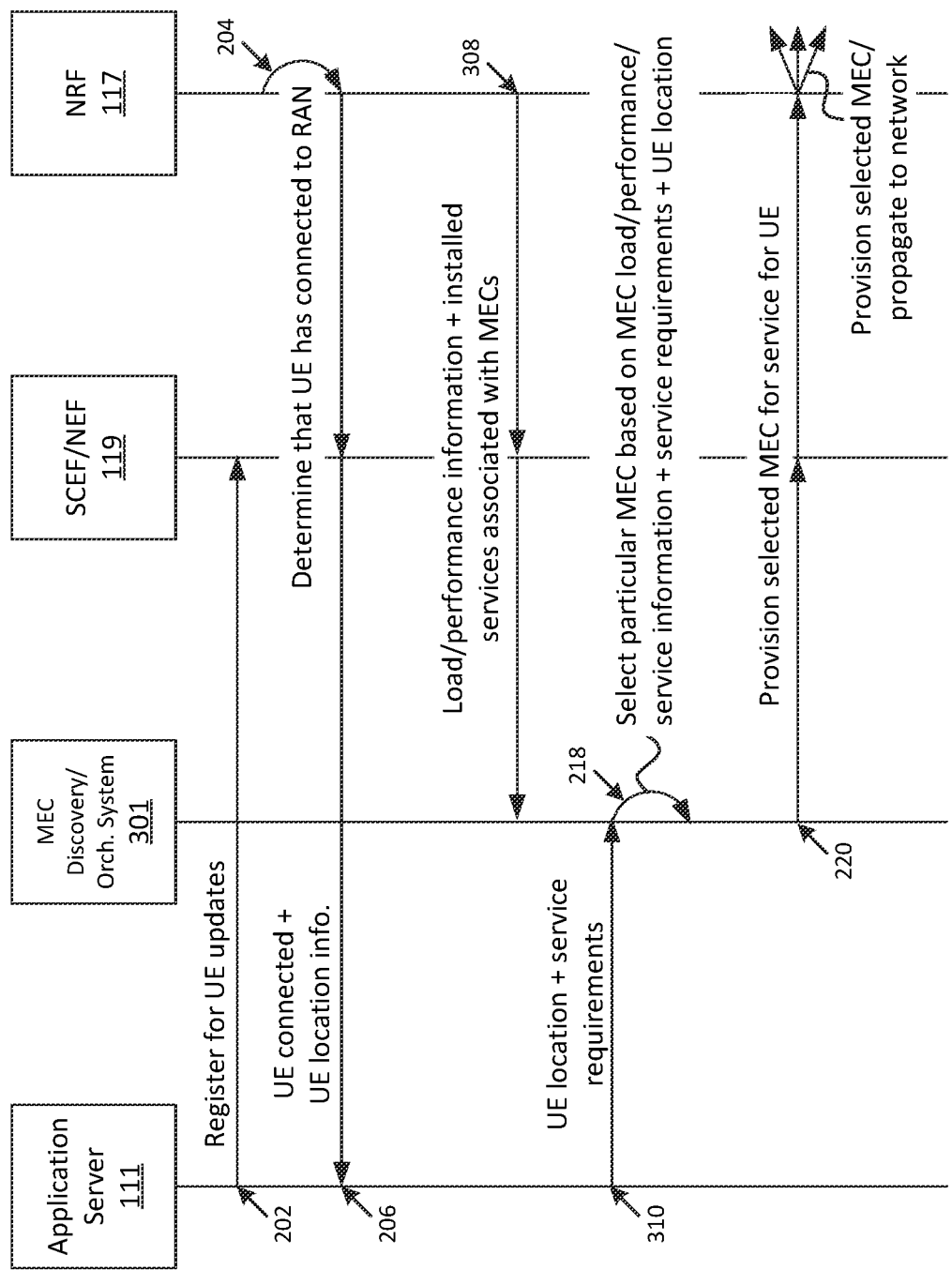

FIG. 3 illustrates another example signal flow in accordance with one or more embodiments, in which an optimal MEC 105 may be selected to provide a given service to one or more UEs 101. Portions of FIG. 3 are the same or similar to those described above with respect to FIG. 2, and share the same reference numerals in FIG. 3. Such portions are not described again in detail below for the sake of brevity. Generally, some or all of the operations described in FIG. 2 as being performed by MEC Discovery System 115 and Orchestration Platform 113 may be performed in FIG. 3 by MEC Discovery/Orchestration System ("MDOS") 301.

As shown in FIG. 3, Application Server 111 may register (at 202) with SCEF/NEF 119 for updates regarding UE 101, NRF 117 may determine (at 204) that UE 101 has connected to a RAN, and may provide (at 206) an indication that UE 101 has connected to the RAN, along with location information associated with UE 101. MDOS 301 may further monitor (at 308) load/performance information and installed service information associated with one or more MECs 105 in a manner similarly described above. For example, NRF 117 may output (e.g., periodically, intermittently, and/or on some other basis) such information to MDOS 301 via SCEF/NEF 119. Application server 111 may further output (at 310) UE location information and service requirements for a requested service to MDOS 301, which may select (at 218) a particular MEC 105 based on MEC load, performance, and/or installed service information, the service requirements, the location of UE 101, and/or one or more other suitable factors as discussed above.

MDOS 301 may further provision (at 220) the selected MEC 105 to provide the requested service to UE 101. For example, the selected MEC 105 may be instructed to provide access to UE 101, one or more network devices may be configured to route traffic to MEC 105 from UE 101 in lieu of to core network 107, and/or one or more other suitable operations.

FIG. 4 illustrates an example determination of a demand for a particular service, and the outputting of a service request based on such determined demand. FIG. 4 is provided in the example of Application Server 111 outputting the service request (e.g., as similarly described above with respect to arrows 210, 216, and/or 310) to Orchestration Platform 113, MEC Discovery System 115, and/or MDOS 301. In some embodiments, Orchestration Platform 113, MEC Discovery System 115, MDOS 301, one or more other devices or systems may determine the demand for the service and/or output the service request.

As shown, for example, Application Server 111 may receive scheduled event information 401, AI/ML-determined event information 403, event-to-service mapping information 405, service requirement information 407, sensor information, and/or other information. Scheduled event information 401 may indicate, for example, events that are scheduled to take place at particular locations at particular times. Such events may include, for example, sporting events at a venue, concerts at the same venue and/or a different venue, medical procedures at a medical facility, and/or other types of scheduled events. In some embodiments, a scheduled event may correspond to a request for service (e.g., received from UE 101) at a particular time and/or location. In some embodiments, scheduled event information 401 may indicate an expected demand for services during such scheduled events, such as a quantity of UEs 101 that are expected to be located within the geographical location associated with the scheduled event and/or are otherwise expected to request access to the particular service at a time corresponding to the scheduled event. In some embodiments, Application Server 111 may identify scheduled event information 401 in an automated process, such as by "crawling" network-accessible schedules, accessing social media platforms, or the like. In some embodiments, Application Server 111 may use AI/ML techniques to analyze historical information regarding events or other correlated information to identify future events. For example, Application Server 111 may identify that a particular event repeats on a given schedule, that a particular event occurs when a different event occurs or has some other type of correlation to the different event, etc. In some embodiments, Application Server 111 may receive manually provided scheduled event information 401 from an administrator or other user associated with Application Server 111.

AI/ML-determined event information 403 may include events determined by way of AI/ML techniques, such as image or video recognition techniques (e.g., computer vision techniques), clustering, neural networks, and/or other types of AI/ML techniques by which events may be identified. For example, AI/ML-determined event information 403 may be determined based on image and/or video data received from one or more cameras, in which feature extraction and/or other suitable techniques may be performed in order to identify objects, actions, or other attributes depicted in the image and/or video data. As one example, the image and/or video data may depict an operating room in a medical facility, one or more individuals wearing medical garments, and medical instruments. Thus, AI/ML-determined event information 403 may indicate that a particular medical procedure is about to take place.

Event-to-service mapping information 405 may include information that correlates particular types of events to particular services. For example, a sporting event may be associated with an AR service in which players' names and/or other information may be overlaid on video data captured by one or more UEs 101 that are located within the venue in which the sporting event is taking place. As another example, a medical procedure event may be associated with a service that provides feedback or guidance for the medical procedure based on image data and/or other types of sensor data (e.g., a patient's vitals) received from medical equipment at the medical facility in which the medical procedure is taking place.

Service requirement information 407 may include information regarding performance and/or other requirements associated with a given service. For example, service requirement information 407 may indicate a maximum latency for a service, a minimum amount of processing, memory, storage, and/or other resources, or other requirements associated with the service.

Based on the received information 401-407, and/or other suitable information, Application Server 111 may output service request 409, in order to initiate the service at a time associated with the determined demand for the service. For example, as discussed above, Application Server 111 may output service request 409 to Orchestration Platform 113, MEC Discovery System 115, NRF 117, SCEF/NEF 119, and/or one or more other devices or systems. Based on outputting service request 409, the requested service may be provisioned at a selected MEC 105, which may be selected such that the service may be delivered to UE 101 in accordance with the service requirements, and/or otherwise with an optimal measure of performance. Service request 409 may indicate a particular geographical location associated with the service (e.g., a location at which demand has been identified), an identification of one or more UEs 101 to which the service should be provided, service requirements associated with the service, or other suitable information.

In some embodiments, Application Server 111 may utilize similar techniques or information to determine that the demand for a given service has ended, such as the end of a scheduled event, the end of an event as determined based on AI/ML analysis of sensor data, etc. Application Server 111 may output an indication that the service should be de-provisioned, based on which the MEC(s) 105 at which the service has been provisioned may de-provision such services. In some embodiments, Application Server 111 may forgo outputting the indication that the service should be de-provisioned in situations where the service is expected to be in demand again in the future, such as within a threshold period of time (e.g., within the next hour, within the next day, etc.). In some embodiments, the threshold period of time may vary based on load and/or demand associated with MEC 105. For example, if MEC 105 is relatively heavily loaded (e.g., over 75% of processing resources, memory resources, and/or other resources utilized), the threshold period of time may be shorter than if MEC 105 is less heavily loaded (e.g., under 75% or some other threshold value of processing resources, memory resources, and/or other resources utilized).

Figure 5:
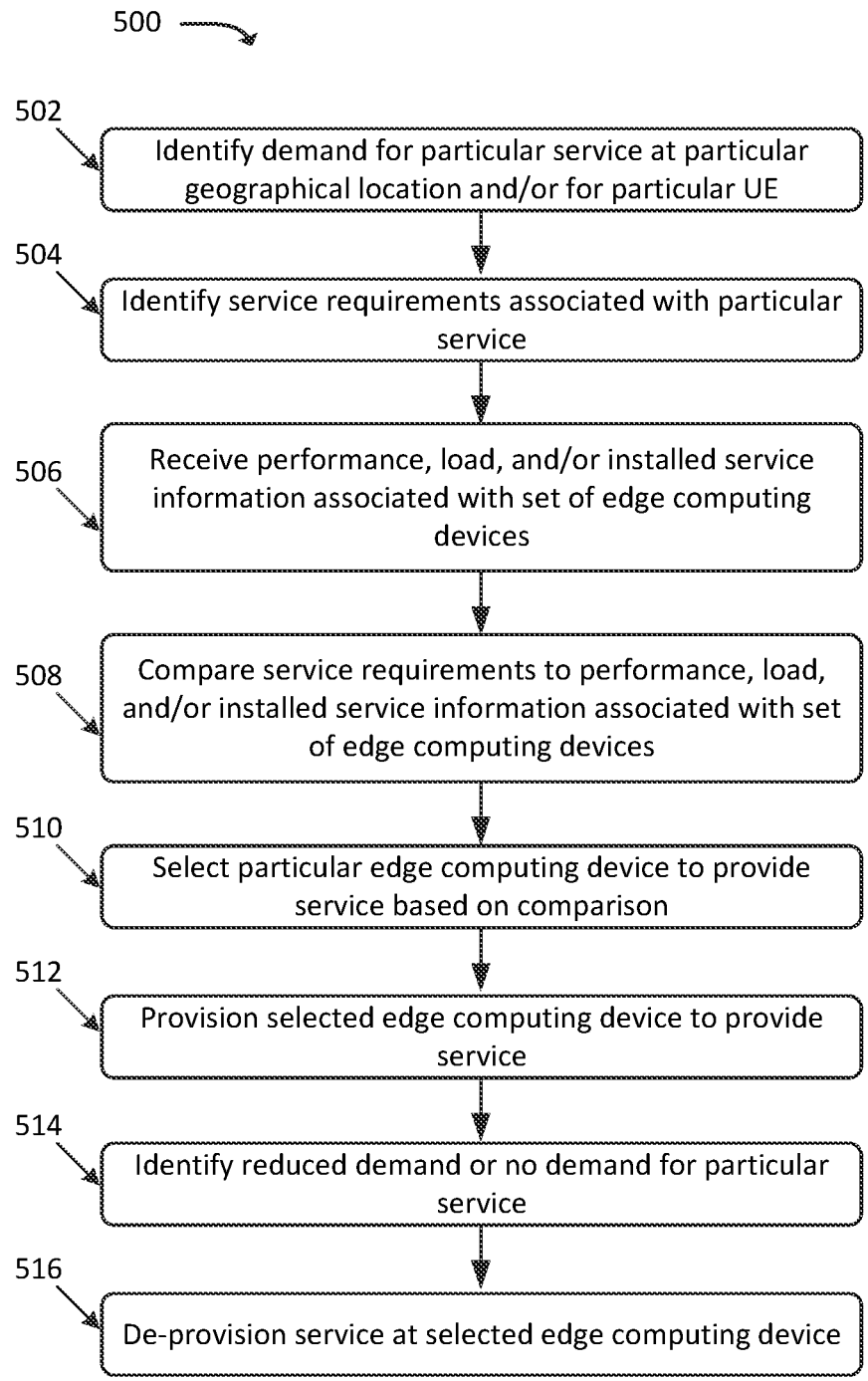
FIG. 5 illustrates an example process for demand-based provisioning of a service at an edge computing device, in accordance with one or more embodiments described herein.

FIG. 5 illustrates an example process 500 for demand-based provisioning of a service at an edge computing device (e.g., a particular MEC 105). In some embodiments, some or all of process 500 may be performed by MDOS 301. In some embodiments, one or more other devices may perform some or all of process 500 in concert with, and/or in lieu of, MDOS 301, such as Application Server 111, Orchestration Platform 113, MEC Discovery System 115, and/or one or more other suitable devices or systems.

As shown, process 500 may include identifying (at 502) a demand for a particular service at a particular geographical location and/or for a particular UE 101. For example, as discussed above, MDOS 301 may receive information associated with a scheduled event (e.g., based on AI/ML techniques and/or other automated techniques), a request from a particular UE 101, and/or in some other suitable manner. In some embodiments, the request may specify a particular geographical location or particular UE 101. For example, in situations where the request specifies a particular UE 101, a location of UE 101 may be determined at such time the request is to be provided (e.g., as described above with respect to FIGS. 2 and 3).

Process 500 may further include identifying (at 504) service requirements associated with the particular service. For example, MDOS 301 may determine latency requirements, processing resource requirements, memory requirements, storage requirements, affinity and/or anti-affinity constraints, and/or other suitable requirements associated with the particular service. In some embodiments, such requirements may be provided by Application Server 111 and/or some other suitable device or system.

Process 500 may additionally include receiving (at 506) performance, load, and/or installed service information associated with a set of edge computing devices. For example, MDOS 301 may receive (e.g., from NRF 117, SCEF/NEF 119, and/or some other device or system), information regarding performance metrics associated with a set of MECs 105, load and/or capacity of MECs 105, and/or services installed at MECs 105. As noted above, the performance metrics may be specific to the particular location associated with the determined demand for service, as MECs 105 may provide differing levels of performance (e.g., latency and/or other performance metrics) to UEs 101 located in different locations. In some embodiments, MDOS 301 may receive and/or request performance metrics and/or other suitable information associated with only a filtered set of MECs 105 that are selected based on the geographical location associated with the requested service. In some embodiments, MDOS 301 may generate one or more scores associated with each particular MEC 105 based on the received performance, load, and/or installed service information.

Process 500 may also include comparing (at 508) the service requirements to the performance, load, and/or installed service information associated with the set of edge computing devices, and selecting (at 510) a particular edge computing device to provide the requested service. For example, MDOS 301 may compare the service requirements to determine which MECs 105 meet the service requirements, and/or may determine which MECs 105 are better suited to provide the service. For example, MDOS 301 may compare one or more scores associated with each MEC 105 to determine a highest score MEC 105, may use AI/ML techniques to identify a "best fit" MEC 105 for the service request, and/or may otherwise select a particular MEC 105 to provide the requested service.

Process 500 may additionally include provisioning (at 512) the selected edge computing device to provide the service. For example, MDOS 301 may output a command, instruction, etc. to one or more elements of a RAN or core network (e.g., via SCEF/NEF 119) to provision the selected MEC 105 to provide the particular service. In some embodiments, MDOS 301 may output an application installation package, a container, or the like for provisioning or installation at MEC 105. Additionally, or alternatively, MDOS 301 may output an identifier of a particular application, container, etc. for MEC 105 to install, instantiate, utilize, etc. In some embodiments, MDOS 301 may output an identifier of UE 101 and/or of the geographical location corresponding to the identified demand for the service. The RAN or core network may propagate the provisioning of MEC 105 to provide the service to UE 101 and/or the geographical location, which may include configuring one or more routing elements to route traffic to MEC 105 (e.g., from UE 101 and/or from UEs 101 located within the geographical region), in lieu of to core network 107.

Process 500 may also include identifying (at 514) a reduced or no demand for the particular service. For example, at a later time, MDOS 301 may identify that the event has ended, that fewer than a threshold quantity of UEs 101 are utilizing the service, may receive an indication that a higher priority service is to be provided by MEC 105, and/or may otherwise identify that the service should no longer be provided by MEC 105.

Process 500 may further include de-provisioning (at 516) the service at the selected edge computing device. For example, MDOS 301 may issue a command, instruction, etc. (e.g., via NRF 117), which may cause MEC 105 to uninstall the service, revoke access to UE 101 and/or UEs 101 located within the particular geographical region, and/or otherwise de-provision the service. In this manner, resources of MEC 105 may be made available for other services.

Figure 6:
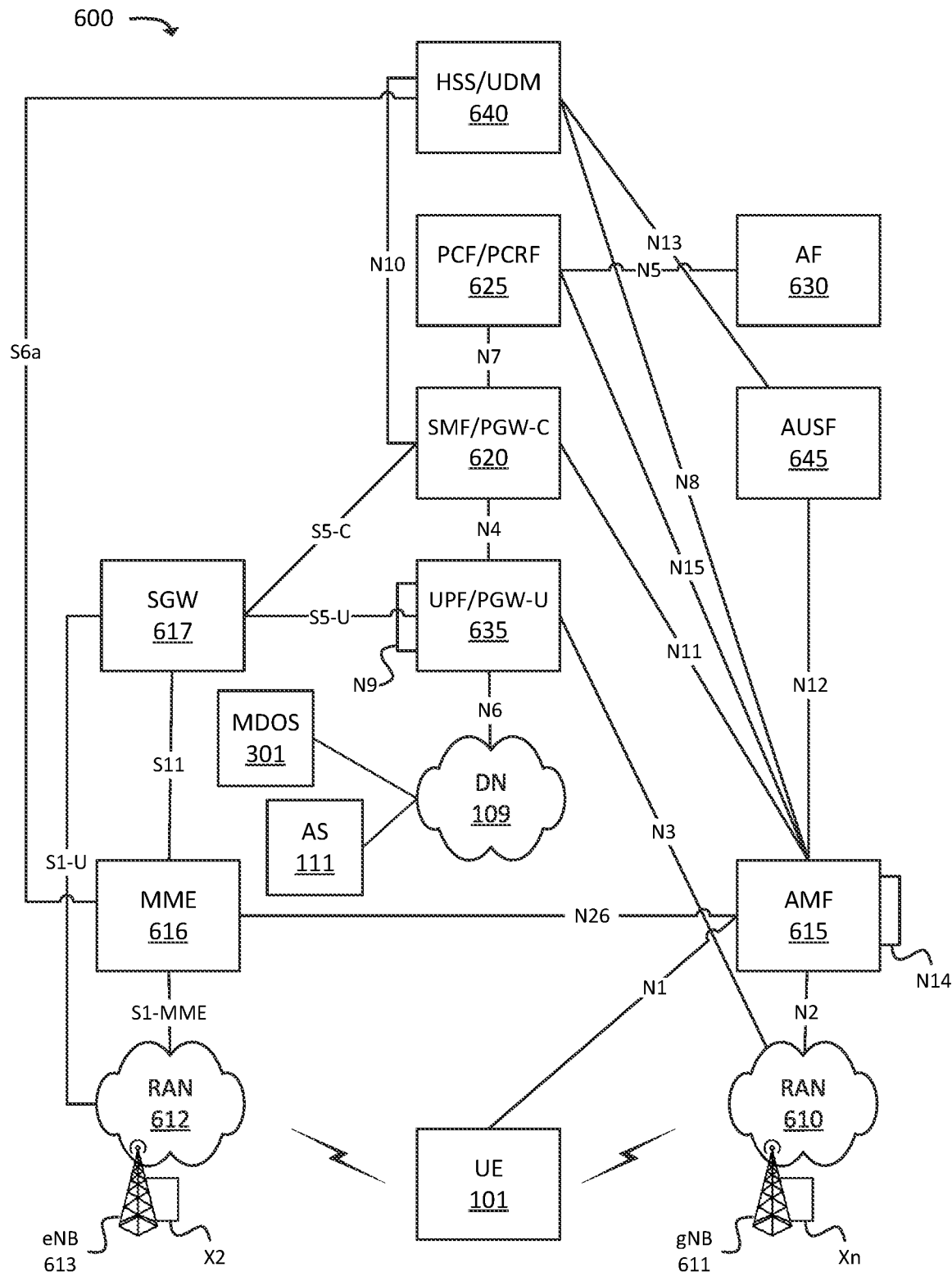
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 600 may include UE 101, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MIME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 109.

Environment 600 may include one or more additional devices or systems communicatively coupled to one or more networks (e.g., DN 109), such as Application Server 111, MDOS 301, Application Server 111, Orchestration Platform 113, and/or MEC Discovery System 115 (e.g., as similarly discussed above). Environment 600 may further include NRF 117 and/or SCEF/NEF 119, which may be communicatively coupled to some or all of the core network components shown in FIG. 6, in order to provide the operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 101 may include a computation and communication device, such as a wireless mobile communication device that is capable of communicating with RAN 610, RAN 612, and/or DN 109. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 109 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, AMF 615, and/or one or more other devices or networks) and may communicate the traffic to UE 101 via the air interface. In some embodiments, base station 103 may be, may include, and/or may be implemented by one or more gNBs 611.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, SGW 617, and/or one or more other devices or networks) and may communicate the traffic to UE 101 via the air interface. In some embodiments, base station 103 may be, may include, and/or may be implemented by one or more eNBs 613.

AMF 615 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 101, from DN 109, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, SMF/PGW-C 620, and/or one or more other devices), and may forward the traffic toward DN 109. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 101.

DN 109 may include one or more wired and/or wireless networks. For example, DN 109 may include an Internet Protocol ("IP")-based PDN, a wide area network ("WAN") such as the Internet, a private enterprise network, and/or one or more other networks. UE 101 may communicate, through DN 109, with data servers, other UEs 101, and/or to other servers or applications that are coupled to DN 109. DN 109 may be connected to one or more other networks, such as a public switched telephone network ("PSTN"), a public land mobile network ("PLMN"), and/or another network. DN 109 may be connected to one or more devices, such as content providers, applications, web servers, and/or other devices, with which UE 101 may communicate.

Figure 7:
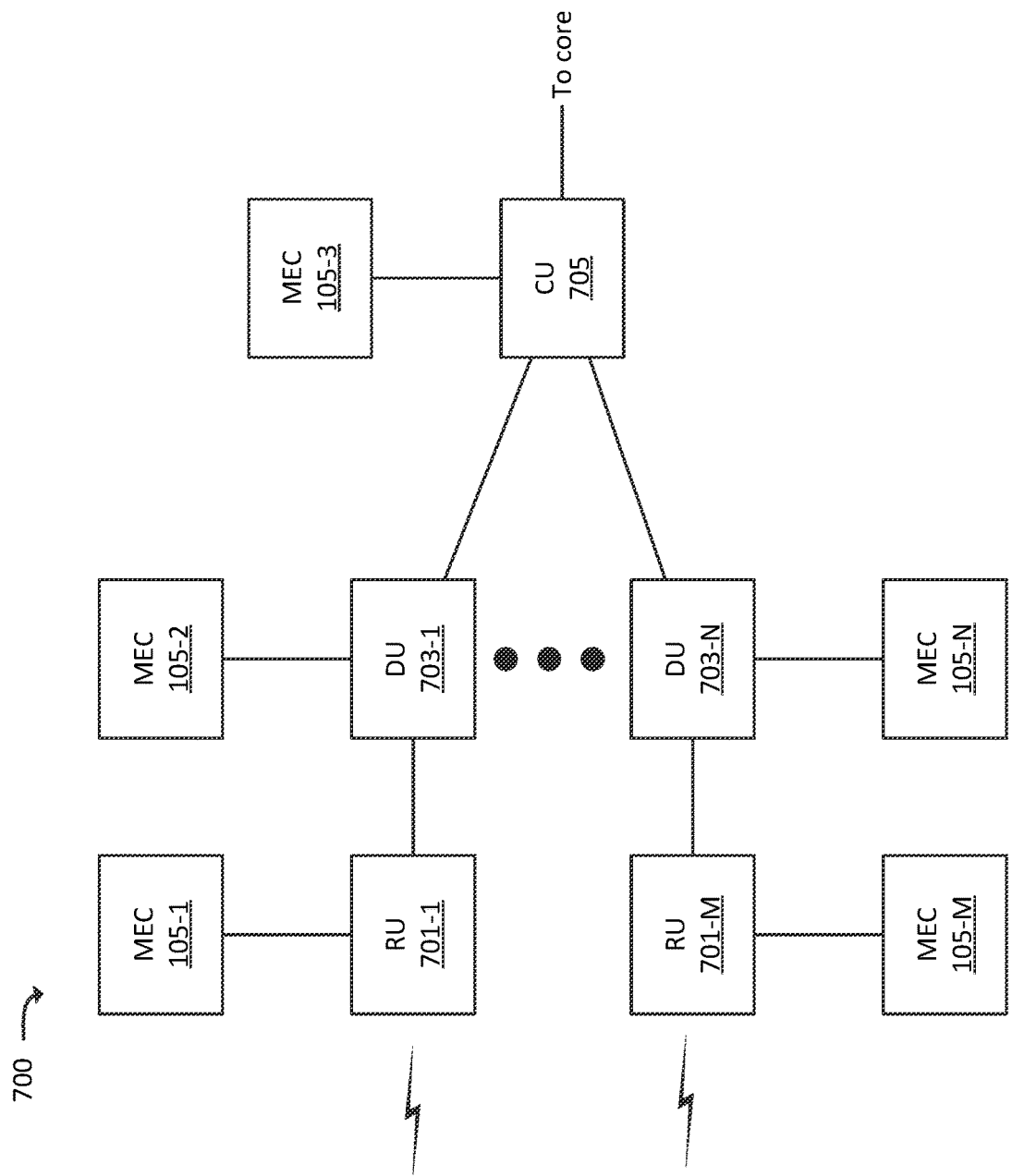
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include CU 705, one or more DUs 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 101 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 101, and may determine which DU(s) 703 should receive the downlink traffic. DU 703 may include one or more devices that transmit traffic between a core network (e.g., via CU 705) and UE 101 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 101.

RU 701 may include hardware circuitry (e.g., one or more RF transceivers, antennas, radios, and/or other suitable hardware) to communicate wirelessly (e.g., via an RF interface) with one or more UEs 101, one or more other DUs 703 (e.g., via RUs 701 associated with DUs 703), and/or any other suitable type of device. In the uplink direction, RU 701 may receive traffic from UE 101 and/or another DU 703 via the RF interface and may provide the traffic to DU 703. In the downlink direction, RU 701 may receive traffic from DU 703, and may provide the traffic to UE 101 and/or another DU 703.

RUs 701 may, in some embodiments, be communicatively coupled to one or more MECs 105. For example, RU 701-1 may be communicatively coupled to MEC 105-1, RU 701-M may be communicatively coupled to MEC 105-M, DU 703-1 may be communicatively coupled to MEC 105-2, DU 703-N may be communicatively coupled to MEC 105-N, CU 705 may be communicatively coupled to MEC 105-3, and so on. MECs 105 may include hardware resources (e.g., configurable or provisionable hardware resources) that may be configured to provide services and/or otherwise process traffic to and/or from UE 101, via a respective RU 701.

For example, RU 701-1 may route some traffic, from UE 101, to MEC 105-1 instead of to a core network (e.g., via DU 703 and CU 705). MEC 105-1 may process the traffic, perform one or more computations based on the received traffic, and may provide traffic to UE 101 via RU 701-1. In this manner, ultra-low latency services may be provided to UE 101, as traffic does not need to traverse DU 703, CU 705, and an intervening backhaul network between DU network 700 and the core network.

Figure 8:
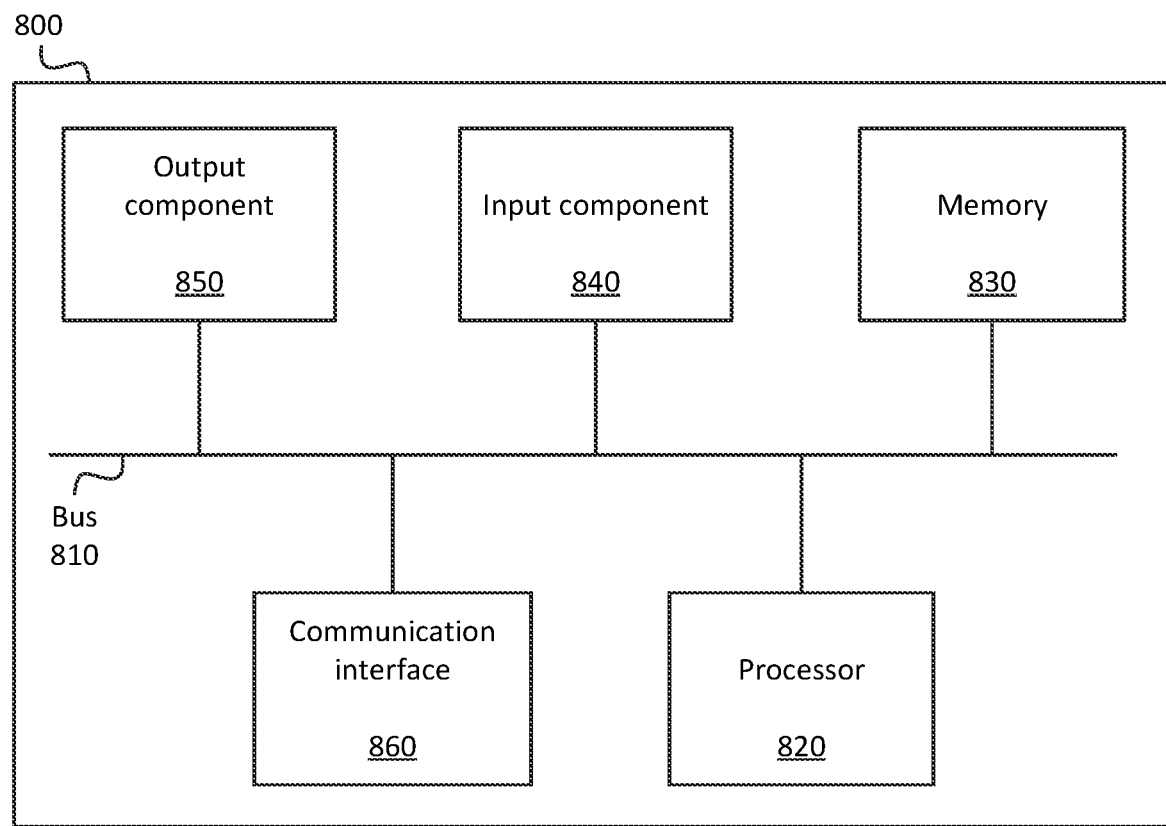
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive image or video data captured by one or more User Equipment ("UEs") that are located at a particular geographical region;
identify one or more features depicted in the received image or video data using an artificial intelligence/machine learning ("AI/ML") analysis;
identify, based on the one or more features depicted in the image or video data received from the one or more UEs that are located at the particular geographical region, a demand for a particular service at the particular geographical location;
identify service requirements associated with the particular service, wherein the service requirements indicate a minimum latency associated with the particular service;

receive performance information associated with a plurality of edge computing devices, wherein the performance information for each edge computing device is based on performance for the each edge computing device with respect to services provided by the each edge computing device to a plurality of UEs that have been located at the particular geographical location;

compare the service requirements associated with the particular service to the performance information associated with the plurality of edge computing devices;

select a particular edge computing device, from the plurality of edge computing devices, based on the comparing; and provision the selected particular edge computing device to provide the service at the particular geographical location.

2. The device of claim 1, wherein the performance information associated with the particular edge computing device with respect to the particular geographical location includes a latency of communications between the particular edge computing device and the plurality of UEs that have been located at the particular geographical location.

3. The device of claim 1, wherein selecting the particular edge computing device includes determining that the particular edge computing device has a highest measure of performance, of services provided to UEs that have been located at the particular geographical location, out of the plurality of edge computing devices.

4. A device, comprising:
one or more processors configured to:
receive image or video data captured by one or more User Equipment ("UEs") that are located at a particular geographical region;

identify one or more features depicted in the received image or video data using an artificial intelligence/machine learning ("AI/ML") analysis;

identify, based on the one or more features depicted in the image or video data received from the one or more UEs that are located at the particular geographical region, a demand for a particular service at the particular geographical location;

identify service requirements associated with the particular service;

receive performance information associated with a plurality of edge computing devices, wherein the performance information for each edge computing device is based on performance for the each edge computing device with respect to services provided by the each edge computing device to a plurality of UEs that have been located at the particular geographical location;

compare the service requirements associated with the particular service to the performance information associated with the plurality of edge computing devices;

select a particular edge computing device, from the plurality of edge computing devices, based on the comparing; and provision the selected particular edge computing device to provide the service at the particular geographical location, wherein provisioning the selected particular edge computing device includes outputting a request to a core of a wireless network via a Service Capability Exposure Function ("SCEF") or a Network Exposure Function ("NEF") associated with the core network.

5. The device of claim 4, wherein the device is external to the core network.

6. The device of claim 4, wherein the performance information associated with the particular edge computing device with respect to the particular geographical location includes a latency of communications between the particular edge computing device and the plurality of UEs that have been located at the particular geographical location.

7. The device of claim 4, wherein selecting the particular edge computing device includes determining that the particular edge computing device has a highest measure of performance, of services provided to UEs that have been located at the particular geographical location, out of the plurality of edge computing devices.

8. A non-transitory computer-readable medium, storing a plurality of processor-executable instructions to:
receive image or video data captured by one or more User Equipment ("UEs") that are located at a particular geographical region;

identify one or more features depicted in the received image or video data using an artificial intelligence/machine learning ("AI/ML") analysis;

identify, based on the one or more features depicted in the image or video data received from the one or more UEs that are located at the particular geographical region, a demand for a particular service at the particular geographical location;

identify service requirements associated with the particular service, wherein the service requirements indicate a minimum latency associated with the particular service;

receive performance information associated with a plurality of edge computing devices, wherein the performance information for each edge computing device is based on performance for the each edge computing device with respect to services provided by the each edge computing device to a plurality of UEs that have been located at the particular geographical location;

compare the service requirements associated with the particular service to the performance information associated with the plurality of edge computing devices;

select a particular edge computing device, from the plurality of edge computing devices, based on the comparing; and provision the selected particular edge computing device to provide the service at the particular geographical location.

9. The non-transitory computer-readable medium of claim 8, wherein the performance information associated with the particular edge computing device with respect to the particular geographical location includes a latency of communications between the plurality of UEs that have been located at the particular geographical location.

10. The non-transitory computer-readable medium of claim 8, wherein selecting the particular edge computing device includes determining that the particular edge computing device has a highest measure of performance, of services provided to UEs that have been located at the particular geographical location, out of the plurality of edge computing devices.

11. The non-transitory computer-readable medium, storing a plurality of processor-executable instructions to:

receive image or video data captured by one or more User Equipment ("UEs") that are located at a particular geographical region;
identify one or more features depicted in the received image or video data using an artificial intelligence/ machine learning ("AI/ML") analysis;
identify, based on the one or more features depicted in the image or video data received from the one or more UEs that are located at the particular geographical region, a demand for a particular service at the particular geographical location;
identify service requirements associated with the particular service;
receive performance information associated with a plurality of edge computing devices, wherein the performance information for each edge computing device is based on performance for the each edge computing device with respect to services provided by the each edge computing device to a plurality of UEs that have been located at the particular geographical location;
compare the service requirements associated with the particular service to the performance information associated with the plurality of edge computing devices;
select a particular edge computing device, from the plurality of edge computing devices, based on the comparing; and
provision the selected particular edge computing device to provide the service at the Particular geographical location, wherein provisioning the selected particular edge computing device includes outputting a request to a core of a wireless network via a Service Capability Exposure Function ("SCEF") or a Network Exposure Function ("NEF") associated with the core network.

12. The non-transitory computer-readable medium of claim 11, wherein the plurality of processor-executable instructions are executed by a device that is external to the core network.

13. The non-transitory computer-readable medium of claim 11, wherein the performance information associated with the particular edge computing device with respect to the particular geographical location includes a latency of communications between the particular edge computing device and the plurality of UEs that have been located at the particular geographical location.

14. The non-transitory computer-readable medium of claim 11, wherein selecting the particular edge computing device includes determining that the particular edge computing device has a highest measure of performance, of services provided to UEs that have been located at the particular geographical location, out of the plurality of edge computing devices.

15. A method, comprising:
receiving image or video data captured by one or more User Equipment ("UEs") that are located at a particular geographical region;
identifying one or more features depicted in the received image or video data using an artificial intelligence/ machine learning ("AI/ML") analysis;
identifying, based on the one or more features depicted in the image or video data received from the one or more UEs that are located at the particular geographical region, a demand for a particular service at the particular geographical location;
identifying service requirements associated with the particular service, wherein the service requirements indicate a minimum latency associated with the particular service;
receiving performance information associated with a plurality of edge computing devices, wherein the performance information for each edge computing device is based on performance for the each edge computing device with respect to services provided by the each edge computing device to a plurality of UEs that have been located at the particular geographical location;
comparing the service requirements associated with the particular service to the performance information associated with the plurality of edge computing devices;
selecting a particular edge computing device, from the plurality of edge computing devices, based on the comparing; and
provisioning the selected particular edge computing device to provide the service at the particular geographical location.

16. The method of claim 15, wherein the performance information associated with the particular edge computing device with respect to the particular geographical location includes a latency of communications between the particular edge computing device and the plurality of UEs that have been located at the particular geographical location.

17. The method of claim 15, wherein selecting the particular edge computing device includes determining that the particular edge computing device has a highest measure of performance, of services provided to UEs that have been located at the particular geographical location, out of the plurality of edge computing devices.

18. A method, comprising:
receiving image or video data captured by one or more User Equipment ("UEs") that are located at a particular geographical region;
identifying one or more features depicted in the received image or video data using an artificial intelligence/ machine learning ("AI/ML") analysis;
identifying, based on the one or more features depicted in the image or video data received from the one or more UEs that are located at the particular geographical region, a demand for a particular service at the particular geographical location;
identifying service requirements associated with the particular service;
receiving performance information associated with a plurality of edge computing devices, wherein the performance information for each edge computing device is based on performance for the each edge computing device with respect to services provided by the each edge computing device to a plurality of UEs that have been located at the particular geographical location;
comparing the service requirements associated with the particular service to the performance information associated with the plurality of edge computing devices;
selecting a particular edge computing device, from the plurality of edge computing devices, based on the comparing; and
provisioning the selected particular edge computing device to provide the service at the Particular geographical location, wherein provisioning the selected particular edge computing device includes outputting a request to a core of a wireless network via a Service Capability Exposure Function ("SCEF") or a Network Exposure Function ("NEF") associated with the core network.

19. The method of claim 18, wherein the performance information associated with the particular edge computing device with respect to the particular geographical location includes a latency of communications between the particular edge computing device and the plurality of UEs that have been located at the particular geographical location.

20. The method of claim 18, wherein selecting the particular edge computing device includes determining that the particular edge computing device has a highest measure of performance, of services provided to UEs that have been located at the particular geographical location, out of the plurality of edge computing devices.

\* \* \* \* \*